United States Patent
Upward et al.

(10) Patent No.: US 9,964,269 B2
(45) Date of Patent: May 8, 2018

(54) LIGHT DISTRIBUTION SYSTEMS AND METHODS

(71) Applicant: THE UNIVERSITY OF BRITISH COLUMBIA, Vancouver (CA)

(72) Inventors: Allen Upward, Vancouver (CA); Lorne Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days. days.

(21) Appl. No.: 15/318,180

(22) PCT Filed: Jun. 11, 2015

(86) PCT No.: PCT/CA2015/000377
§ 371 (c)(1),
(2) Date: Dec. 12, 2016

(87) PCT Pub. No.: WO2015/188260
PCT Pub. Date: Dec. 17, 2015

(65) Prior Publication Data
US 2017/0130919 A1 May 11, 2017

Related U.S. Application Data

(60) Provisional application No. 62/011,377, filed on Jun. 12, 2014.

(51) Int. Cl.
*F21S 11/00* (2006.01)
*G02B 19/00* (2006.01)
(Continued)

(52) U.S. Cl.
CPC .......... *F21S 11/007* (2013.01); *G02B 17/002* (2013.01); *G02B 17/006* (2013.01);
(Continued)

(58) Field of Classification Search
CPC ...... F21S 11/007; F21S 11/002; F21S 11/006; G02B 17/006; G02B 19/0019; G02B 19/0042
(Continued)

(56) References Cited

U.S. PATENT DOCUMENTS 618,280 A   1/1899   Manning
717,783 A   1/1903   Wadsworth
(Continued)

FOREIGN PATENT DOCUMENTS

CN   1630798 A   6/2005
CN   2867095 Y   2/2007
(Continued)

OTHER PUBLICATIONS

International Energy Agency, "Daylight in Buildings—Energy Conservation in Buildings & Community Systems & Solar Heating and Cooling Programmes," ECBCS Annex 29/ SHC Task 21 Project Summary Report, United Kingdom: AECOM Ltd, 2010.
(Continued)

*Primary Examiner* — Christopher Mahoney
(74) *Attorney, Agent, or Firm* — Oyen Wiggs Green & Mutala LLP

(57) ABSTRACT

Apparatuses, systems, and methods in which reflective slats are configured to redirect light received from various sun positions are provided. The slats or mirrored array could be coupled to a base of the redirector, such that an adjustment of an angle of the base relative to the horizontal adjusts an angle of each slat relative to the horizontal. In some aspects, an algorithm can be used to determine the angle of tilt that maximizes the transmission efficiency for the mirror array.

17 Claims, 9 Drawing Sheets

(51) Int. Cl.
*G02B 17/00* (2006.01)
*G02B 26/08* (2006.01)

(52) U.S. Cl.
CPC ..... *G02B 19/0019* (2013.01); *G02B 19/0042* (2013.01); *G02B 26/0816* (2013.01)

(58) Field of Classification Search
USPC .......................................................... 359/596
See application file for complete search history.

(56) References Cited

U.S. PATENT DOCUMENTS

| | | |
|---|---|---|
| 721,258 A | 2/1903 | Wadsworth |
| 729,660 A | 6/1903 | Poulson |
| 1,567,984 A | 12/1925 | Reid |
| 1,822,029 A | 9/1931 | Harvey |
| 2,022,144 A | 11/1935 | Nicolson |
| 3,709,583 A | 1/1973 | Pfannkuch et al. |
| 4,056,313 A | 11/1977 | Arbogast |
| 4,102,329 A | 7/1978 | Smith, Jr. |
| 4,110,010 A | 8/1978 | Hilton |
| 4,129,360 A | 12/1978 | Deflandre et al. |
| 4,152,752 A | 5/1979 | Niemi |
| 4,284,061 A | 8/1981 | Wildenrotter |
| 4,425,904 A | 1/1984 | Butler |
| 4,466,423 A | 8/1984 | Dolan et al. |
| 4,509,825 A | 4/1985 | Otto et al. |
| 4,593,976 A | 6/1986 | Eijadi et al. |
| 4,630,892 A | 12/1986 | Howard |
| 4,820,020 A | 4/1989 | Terrill |
| 4,883,340 A | 11/1989 | Dominguez |
| 5,285,315 A | 2/1994 | Stiles |
| 5,295,051 A | 3/1994 | Cowling |
| 5,709,456 A | 1/1998 | Smith et al. |
| 5,787,878 A | 8/1998 | Ratliff, Jr. |
| 5,851,309 A | 12/1998 | Kousa |
| 5,980,052 A | 11/1999 | Thor et al. |
| 5,999,323 A | 12/1999 | Wood |
| 6,059,438 A | 5/2000 | Smith et al. |
| 6,239,910 B1 | 5/2001 | Digert |
| 6,478,072 B1 | 11/2002 | Allman |
| 6,552,257 B1 | 4/2003 | Hart et al. |
| 6,990,773 B2 | 1/2006 | Borges |
| 7,203,004 B2 | 4/2007 | Zhang |
| 7,352,509 B2 | 4/2008 | Pagel |
| 8,000,014 B2 | 8/2011 | Whitehead et al. |
| 8,027,092 B1 | 9/2011 | Huff et al. |
| 8,371,078 B2 | 2/2013 | Jaster |
| 8,462,437 B2 | 6/2013 | Thuot et al. |
| 8,491,138 B2 | 7/2013 | O |
| 8,611,011 B2 | 12/2013 | Whitehead |
| 8,723,092 B2 | 5/2014 | Bartenbach |
| 8,742,250 B2 | 6/2014 | Schmaelzle et al. |
| 8,928,981 B2 | 1/2015 | Whitehead |
| 9,057,535 B2 | 6/2015 | Frazier et al. |
| 2001/0019451 A1 | 9/2001 | Digert et al. |
| 2005/0128728 A1 | 6/2005 | Eisenman et al. |
| 2006/0013001 A1 | 1/2006 | Roth |
| 2008/0202703 A1 | 8/2008 | Edmonds |
| 2008/0219010 A1 | 9/2008 | Oyama |
| 2008/0264409 A1 | 10/2008 | Shukla |
| 2009/0173375 A1 | 7/2009 | Frazier et al. |
| 2009/0314325 A1 | 12/2009 | Borton |
| 2010/0254010 A1 | 10/2010 | Whitehead et al. |
| 2010/0254011 A1 | 10/2010 | Griffiths |
| 2010/0300510 A1 | 12/2010 | Goldman et al. |
| 2011/0272002 A1 | 11/2011 | Liu |
| 2012/0011782 A1 | 1/2012 | Kolås et al. |
| 2012/0031463 A1 | 2/2012 | Schmaelzle et al. |
| 2012/0120496 A1 | 5/2012 | Thuot et al. |
| 2012/0126098 A1 | 5/2012 | Bartenbach |
| 2013/0084040 A1 | 4/2013 | Scott et al. |
| 2013/0120844 A1 | 5/2013 | Freier |
| 2013/0188261 A1 | 7/2013 | Mosher |
| 2013/0250422 A1 | 9/2013 | Tandler |
| 2013/0279008 A1 | 10/2013 | Whitehead |
| 2013/0321923 A1 | 12/2013 | Thuot et al. |
| 2014/0085728 A1 | 3/2014 | Whitehead |
| 2016/0178150 A1* | 6/2016 | Whitehead ............ F21V 7/0033 359/593 |

FOREIGN PATENT DOCUMENTS

| | | |
|---|---|---|
| DE | 202009001664 U1 | 6/2009 |
| EP | 0251162 A2 | 1/1988 |
| EP | 1785677 A2 | 5/2007 |
| JP | 61027517 A | 2/1986 |
| JP | H06-67079 A | 3/1994 |
| JP | H06-313835 A | 11/1994 |
| JP | 07105708 A | 4/1995 |
| JP | 2013045640 A | 3/2013 |
| KR | 10200074065 A | 12/2000 |
| KR | 20010086678 A | 9/2001 |
| KR | 10-1021166 B1 | 3/2011 |
| WO | 02070966 A1 | 9/2002 |
| WO | 2006021976 A1 | 3/2006 |
| WO | 2009000070 A1 | 12/2008 |
| WO | 2010101468 A1 | 9/2010 |
| WO | 2011012301 A1 | 2/2011 |
| WO | 2012051095 A1 | 4/2012 |
| WO | 2013059908 A1 | 5/2013 |
| WO | 2013093796 A1 | 6/2013 |
| WO | 2014172779 A1 | 10/2014 |

OTHER PUBLICATIONS

Entech Solar, "Entech Collimating Skylight—Economical daylighting technology that doubles the amount of light where you want it," Texas: Entech Solar, Inc., 2011.
Sun Dolier, "Core Daylighting," http://www.sundoliercom/index.php/products/product-diagram/coredaylighting, Colorado: Sundolier, 2012.
Callow et al., "Air-clad optical rod daylighting system," Lighting Res. Technol. 35, 1 (2003): 31-38.
Greenup et al., "Test room measurements and computer simulations of the micro-light guiding shade daylight redirecting device," Solar Energy 76 (2004): 99-109.
Rosemann et al., "Lightpipe applications for daylighting systems," Solar Energy 78 (2005): 772-780.
Rosemann et al., "A Cost-Effective Solution for Core Daylighting in Office Buildings," American Solar Energy Society Solar Conference (2006): 1-6.
Schlegel et al., "Analysis of a full spectrum hybrid lighting system," Solar Energy 76 (2004): 359-368.
Tsangrassoulis et al., "On the energy efficiency of a prototype hybrid daylighting system," Solar Energy 79 (2005): 56-64.
Whitehead et al., "A Cost-Effective Approach to Core Daylighting," 2nd Canadian Solar Buildings Conference, Calgary (Jun. 10-14, 2007): 1-6.
Whitehead et al., "A New Device for Distributing Concentrated Sunlight in Building Interiors," Energy and Buildings 6 (1984): 119-125.

* cited by examiner

LIGHT DISTRIBUTION SYSTEMS AND METHODS

This application claims priority to U.S. provisional application No. 62/011,377 filed Jun. 12, 2014. This and all other extrinsic materials identified herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is light distribution systems and methods, and more specifically sunlight distribution systems including adjustable mirror arrays.

BACKGROUND

The background description includes information that may be useful in understanding the present invention. It is not an admission that any of the information provided herein is prior art or relevant to the presently claimed invention, or that any publication specifically or implicitly referenced is prior art.

With the rise in demand for green technologies, various efforts have been placed in developing systems and methods for redirecting sunlight to interiors of buildings. For example, "Project Summary Report—Daylight in Buildings", published by the International Energy Agency in 2010; U.S. patent publication 2010/0254010 to Whitehead et al. titled "Adaptive Sunlight Redirector", filed Jun. 16, 2008; U.S. patent publication 2012/0011782 to Kolas et al. titled "Fenestration System with Solar Cells", filed Sep. 28, 2011; U.S. Pat. No. 8,027,092 to Huff et al. titled "Curved Light Shelf System for Daylighting an Interior Space", filed Jan. 21, 2011; U.S. patent publication 2005/0128728 to Eisenman et al. titled "Light Tube System for Distributing Sunlight or Artificial Light Singly or in Combination", filed Jan. 7, 2005; U.S. patent publication 2011/0272002 to Liu titled "Sunlight Collecting System for Illumination", filed May 3, 2011; and U.S. patent publication 2006/0013001 to Roth titled "Reflectors for Condensed Light Beam Distribution", filed Jul. 5, 2005 describe various systems that redirect available sunlight from a window, a roof or other location to the interior of a building.

Unfortunately, the above known references all exhibit certain limitations. For instance, the locations on which the light collecting/harvesting structures can be mounted appear to be limited to those that receive abundant sunlight throughout the day (e.g., the roof, the side(s) of the building that faces the sun). Furthermore, the usefulness of the available sunlight received by light collecting/harvesting structures, in terms of its ability to be efficiently introduced into and guided by the light guiding structure, varies throughout the day as the sunlight comes from different directions at different times of the day.

U.S. Pat. No. 8,611,011 to Whitehead teaches systems that overcome many of the limitations of systems that came before it, and enables sunlight to be redirected at a first angle and further distributed at a different angle to an interior of the building.

International Patent Application Publication WO2013/059908 to Whitehead describes the sunlight redirector shown in Prior Art FIG. 1, which includes a plurality of longitudinal, pivotable mirrors. The '908 Publication's sunlight redirector 10 includes a plurality of parallel, uniformly spaced, longitudinal mirror segments 12, which are interconnected in a manner similar to that used to interconnect Venetian blind slats. A controller coupled to one or more of segments 12 can be selectably actuated to simultaneously pivot all of segments 12, as indicated by double-headed arrow 14. Segments 12 can thus be pivotally adjusted, in the manner of a Venetian blind, such that their respective normal vectors 16 remain parallel. Segments 12 are of differing lengths, and are arranged such that sunlight redirector 10 has a circular front elevational shape. Sunlight redirector 10 is rotatable about its normal vector 18, as indicated by double-headed arrow 20.

Sunlight redirector 10 can thus be rotated to track the sun's azimuthal motion relative to the array's normal vector 18, and segments 12 can be pivotally adjusted to compensate for changes in the sun's altitude, so that light rays reflected by segments 12 will be redirected in a desired, fixed direction, e.g. parallel to normal vector 18 to facilitate redirection of light rays through a wall opening to illuminate the interior of a building.

Prior Art FIGS. 2A, 2B and 2C illustrate a potential disadvantage of using sunlight redirector 10's segments 12 to redirect light—redirection efficiency depends on the desired redirection angle. FIG. 2A depicts a small redirection angle situation in which the mirror segments (represented by solid lines 12) are nearly parallel to the incident light, so most rays (represented by dashed lines) do not strike the mirrors and are therefore not redirected as desired. FIG. 2B depicts an intermediate situation in which the mirror segments are obliquely angled relative to the incident light, with most rays striking the mirrors and being redirected as desired. FIG. 2C depicts a situation in which the desired redirection angle is so large that the mirror segments are positioned at such a large oblique angle relative to the incident light that most rays which strike the mirrors are redirected onto an adjacent mirror, then further redirected away from the desired direction. The FIGS. 2A and 2C scenarios are problematic since it is desirable to redirect rays corresponding to a wide range of sun angles. Another potential disadvantage of sunlight redirector 10 is possible increased complexity and cost in rotatably moving sunlight redirector 10 about normal vector 18.

Prior Art FIG. 3 depicts a stationary sunlight redirector 30 which attempts to overcome the potential disadvantages of the '908 Publication, which can be found in International Patent Application No. PCT/CA2014/000368. The '368 Application describes sunlight redirectors in which longitudinally outward segments 70A, 72A, 74A, 76A are adjustably positionable throughout a range of sun-tracking positions. Inward segments 70B, 72B, 74B, 76B, 78B either remain fixed in position at all times or they may be moved, twice per day, between the first and second fixed positions.

Unfortunately, while the approach of the '368 Application can be somewhat effective, the additional cost and complexity of providing adjustably positionable inward mirror segments 70A, 72A, 74A may not be warranted in all cases.

It has yet to be appreciated that a light distribution system could be highly effective and produced at a relatively low cost. Thus, there is still a need in the art for improved light distribution systems and methods.

SUMMARY

A mirror array assembly (also referred to herein as "a redirector") having a stationary base is capable of deflecting a portion of an incident sun beam by reflection off mirror surfaces (also referred to herein as "slats"). The angle of deflection can be determined by the mirror orientation in space, which in turn can be determined by, for example, the orientation of the mirrors relative to the array, and the orientation of the array relative to a building. One of the disadvantages of systems including only a single array assembly and a stationary base is that it is most efficient for one input direction, and one output direction, relative to the array itself. Because the sun moves through a wide angle of directions in the sky, on average the single array assembly is not adequate for appropriately redirecting a substantial fraction of the incident light rays.

Applicants have surprisingly discovered that greater efficiency can be provided via a mirror array assembly that is configured to tilt about an axis parallel to the longitudinal segments. Viewed from another perspective, the inventive subject matter provides a greater degree of angular control, by allowing the single mirror array assembly to tilt about an axis parallel to the longitudinal segments.

Thus, the inventive subject matter provides apparatus, systems, and methods in which reflective slats of a redirector are configured to redirect light received from various sun positions. The slats could be coupled to a base of the redirector, such that an adjustment of an angle of the base relative to the horizontal adjusts an angle of each slat relative to the horizontal. In some aspects, an algorithm can be used to determine the angle of tilt that maximizes the transmission efficiency for the mirror array.

Some or all of the slats coupled to a base of a redirector can be substantially parallel to one another. As used herein, the term "substantially parallel slats" includes slats that are exactly parallel to one another, or slats forming an angle of less than 10 degrees when placed side by side.

In other aspects of the inventive subject matter, a light redirection system comprises a redirector including a plurality of (two or more) slats, some or all of which are coupled to a base and include at least one reflective portion. Each reflective portion could sequentially redirect light at different angles based at least in part on an adjustment of the angle between a length of the base and the horizontal. The angle between the length of the base and the horizontal could be adjusted via any suitable adjustment mechanism.

In some contemplated redirection systems, a second redirector could be directly or indirectly coupled to the first redirector, and include a second mirrored array (e.g., a second base coupled to two or more different slats). Some or all of the slats of the second redirector can similarly include at least one reflective surface configured to redirect light at different angles based at least in part on an adjustment of an angle between the length of the second base and the horizontal. The adjustment can be enabled via the same adjustment mechanism that enables an adjustment of the angle between the length of the first base and the horizontal. Additionally or alternatively, the adjustment can be enabled via a second adjustment mechanism. Contemplated adjustment mechanisms could be configured to adjust the first and second (and other) redirectors of a system simultaneously or sequentially.

The first and second redirectors can be adjustable relative to one another, and light redirected from slats of the first redirector can be further redirected by slats of the second redirector. It is contemplated that any or all adjustment mechanisms of a system can enable adjustments of one or more angles (e.g., between the length of a base and the horizontal, between the length of a base and the length of another base, etc.) based at least in part on an algorithm that selects one or more optimal orientations (e.g., of slats, of the base, etc.). The optimal orientations can be determined based on at least one of the angle of incoming light, the desired destination of the redirected light, and a placement of a downstream redirector.

In other aspects of the inventive subject matter, a system can include a third redirector comprising a third base coupled to two or more slats. The third redirector can be placed downstream of the first and second redirectors. Some or all of the slats of the third redirector can be configured to redirect light received from slats of at least one of the first and second redirectors to a desired location.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed subject matter provides many advantageous technical effects including sunlight redirection system that can efficiently redirect sunlight that comes from different directions depending on, for example, the time of day. Contemplated systems can additionally redirect the light received at various angle to a specified target area using a series of redirectors having adjustable slats.

Figure 1:
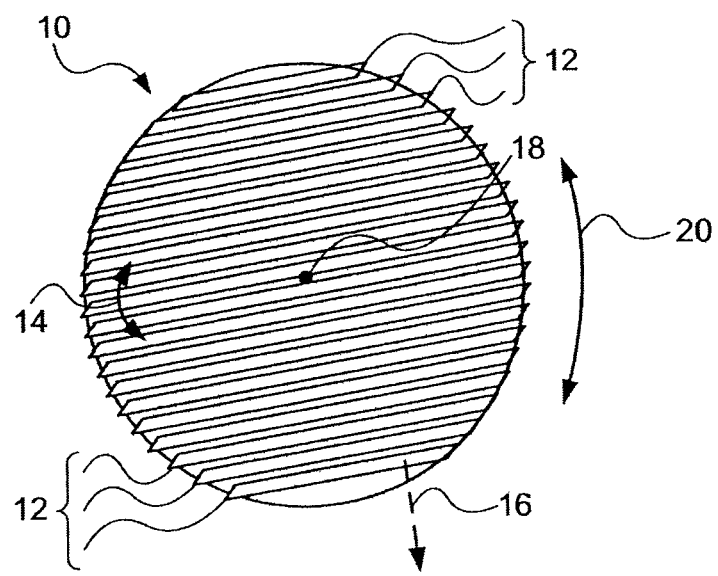
FIG. 1 illustrates a prior art redirector.
Figure 2A:
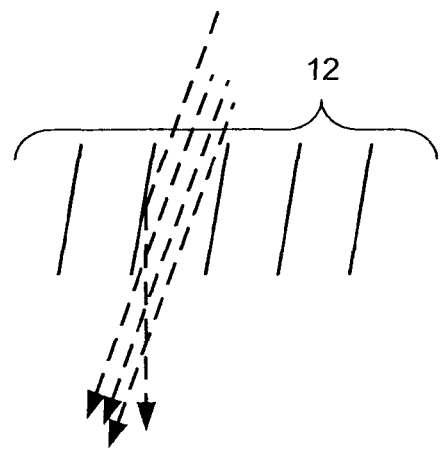
FIGS. 2A-2C illustrate light passing through a prior art redirector.
Figure 2B:
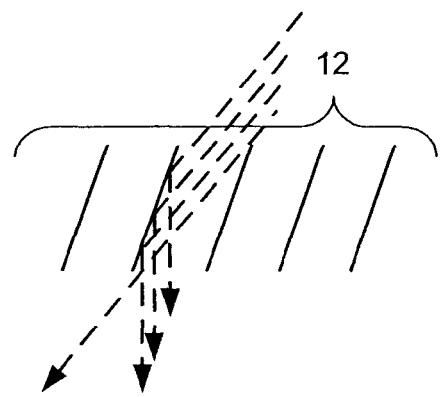
Figure 2C:
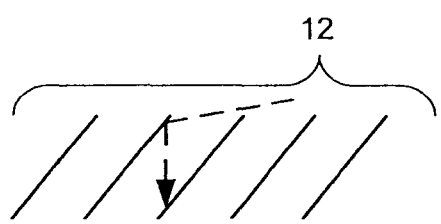
Figure 3:
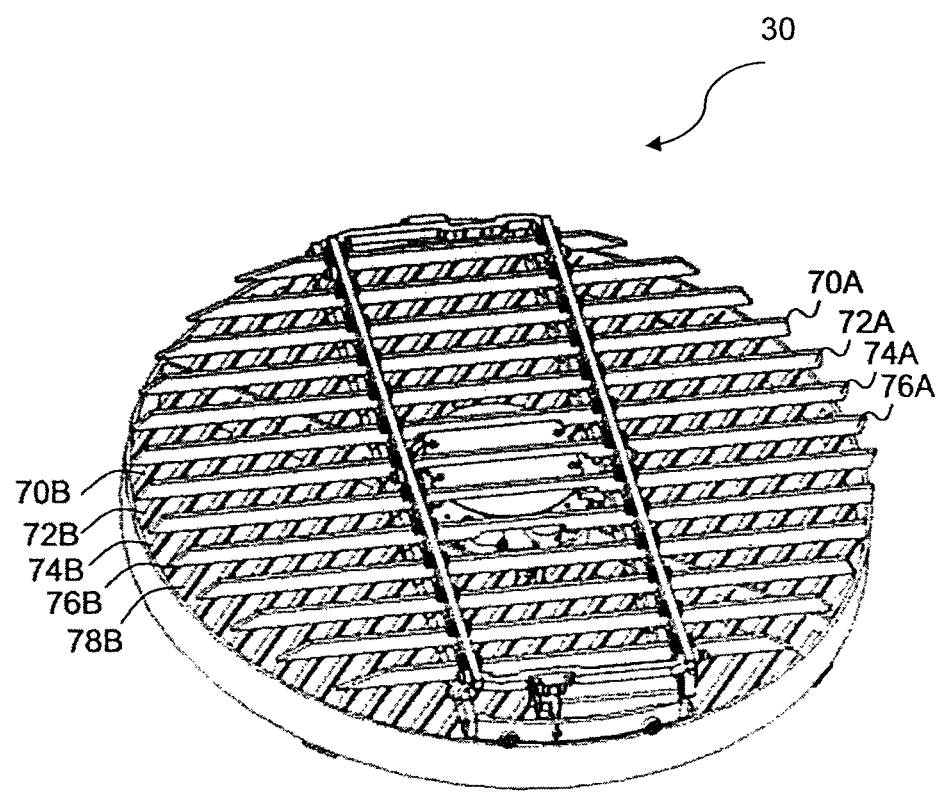
FIG. 3 illustrates another prior art redirector.
Figure 4A:
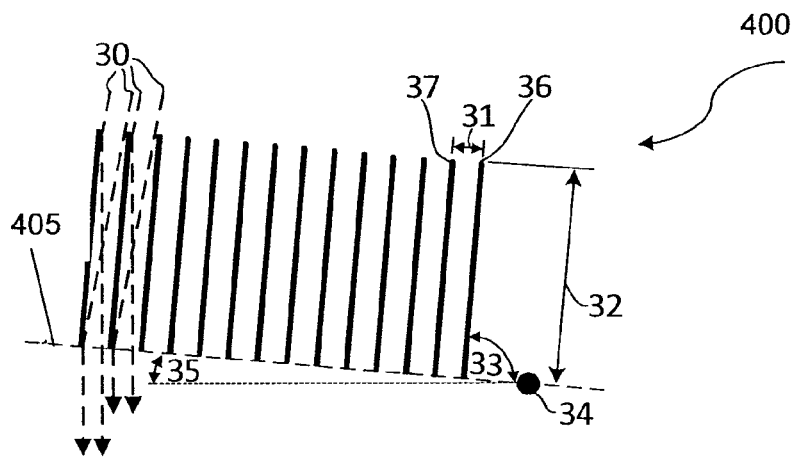
FIGS. 4A-4C illustrates exemplary redirection systems of the inventive subject matter each including a mirror array redirector that is rotatable about an axis (e.g., an axis parallel to the longitudinal segments) or a normal vector of the sunlight redirector.
Figure 4B:
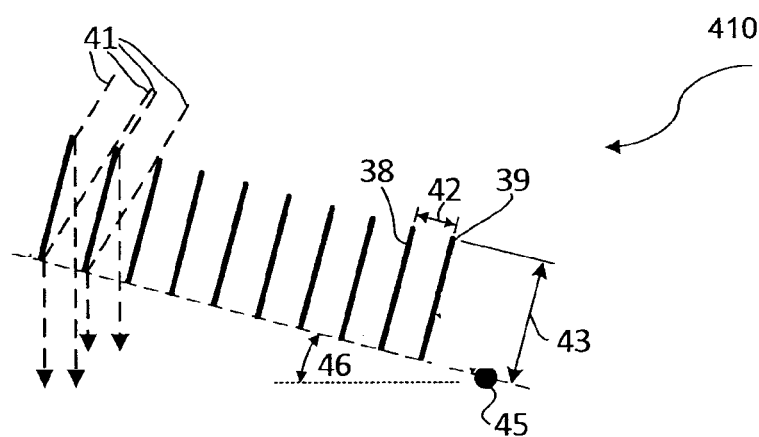
Figure 4C:
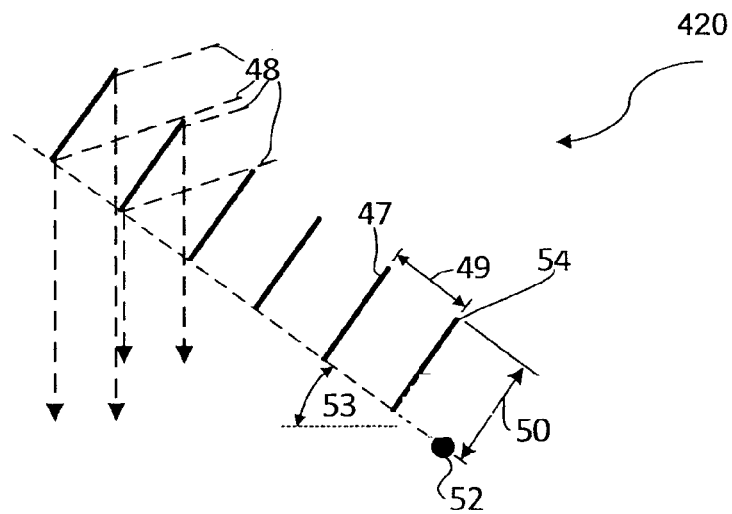

FIG. 4A-4C illustrate some exemplary redirection systems of the inventive subject matter that includes only a single redirector and has mirror spacing that could maximize the array transmission efficiency for high, mid, and low sun positions, respectively. The spacing ratio in each case can be calculated as the mirror spacing ratio (indicated by label 31 in FIG. 4A) divided by the mirror height dimension (indicated by label 32 in FIG. 4A).

Redirector 400 comprises a plurality of slats (36 and 37) coupled to a base 405 and an adjustment mechanism 34. As illustrated, each of the plurality of slats 400A is substantially parallel to one another, and is substantially the same height 32. Additionally, some or all of the slats are uniformly spaced apart. As used herein, uniformly spaced slats includes a set of slats wherein a first slat is separated from a second slat on a first side by a distance X, and wherein the first slat is separated from a third slat on a second side by a distance (X±10%). However, it should be appreciated that the slats could have any suitable angles or orientations relative to one another.

Slats of redirector 400 include a reflective surface and are each configured to redirect sunlight 30 to a desired location. Redirector 400, as shown, could have an optimal orientation and spacing between slats (e.g., 36 and 37) for redirecting rays from a high sun position. However, to allow redirection of sunlight received at various angles, redirector 400 can include one or more points of adjustability. One point of adjustability can comprise angle 33 between one or more slats and the base. As shown, angle 33 is approximately 90 degrees. However, it is contemplated that angle 33 could be adjustable between 75 and 105 degrees, between 60 and 120 degrees, between 45 and 135 degrees, or even between 30 and 150 degrees or more. Another point of adjustability can comprise angle 35 between the base and the horizontal. As shown, angle 35 is small (e.g., between 0 and 25 degrees) relative to angle 46 (e.g., between 25 and 35) and angle 53 (e.g., between 35 and 65) of FIGS. 4B and 4C, respectively. Yet another point of adjustability can comprise the mirror spacing ratio (label 31 divided by label 32), which can in some embodiments range from between 0.1 and 5.0, more preferably between 0.1 and 3.0.

It should be appreciated that the adjustments of contemplated systems can be accomplished through the use of any commercially suitable adjustment mechanism(s). Exemplary adjustment mechanisms include one or more of: a motor (e.g., a solar powered motor, an actuator, etc.); a set of mirrored slats, each of which is attached to one or more control lines (e.g., control lines forming a base, frame, etc.) such that each or the slats can simultaneously be adjusted; a universal joint, hinge pivot, or any other suitable adjustment mechanisms, components, or combinations thereof. Some contemplated actuator mechanism components suitable for some embodiments include linear actuator Part No 37443-05-915 by Haydon Kerk, and geared stepper motor Part No AM2224-AV-4.8-12+22E 809:1+MG03 from Faulhaber.

Redirector 410, as shown, could have an optimal orientation and spacing between slats (e.g., 38 and 39) for redirecting rays from a medium sun position. The length 43 of the slats 38, 39 are shorter than length 32 of slats 36, 37, and the spacing 42 between the slats is greater to accommodate sunlight 41 being received from a lower sun position. Additionally, angle 46 between the base and the horizontal is greater than angle 35 to account for the angle of the sunlight being received. It should be appreciated that angle 46 could be adjusted via adjustment mechanism 45 to account for changes in sun position.

Redirector 420, as shown, could have an optimal orientation and spacing between slats (e.g., 47 and 54) for redirecting rays from a low sun position. The length 50 of the slats 47, 54 are shorter than length 43 of slats 38, 39, and the spacing 49 between the slats is greater to accommodate sunlight 48 being received from an even lower sun position. Additionally, angle 53 between the base and the horizontal is greater than angle 46 to account for the angle of the sunlight being received. It should be appreciated that angle 53 could be adjusted via adjustment mechanism 52 to account for changes in sun position.

Figure 5A:
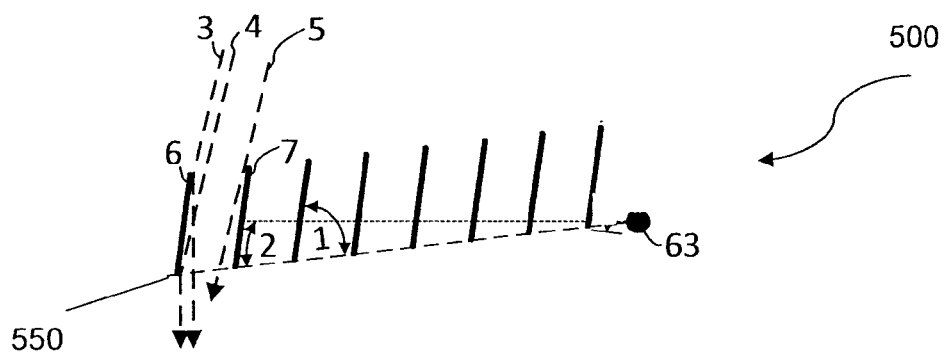
FIGS. 5A-5B illustrate another redirection system having slats that are not orthogonal to the plane of the array.
Figure 5B:
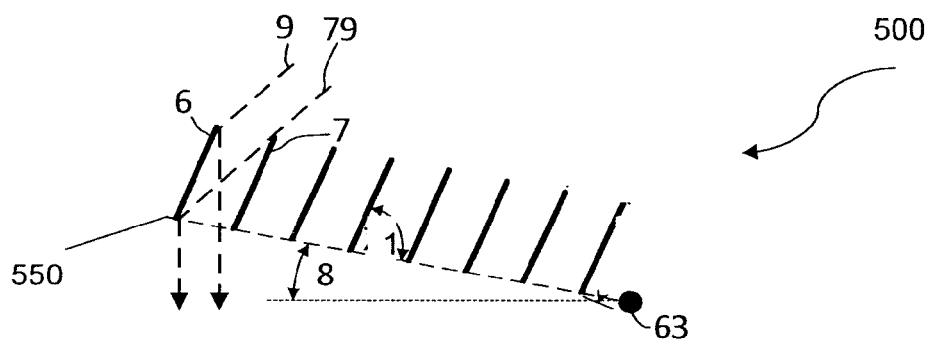

FIGS. 5A-5B illustrate a redirector 500 being adjusted to accommodate sunlight received from different angles. Redirector 500 includes a base 550, which is coupled to an adjustment mechanism 63, and a mirror array (plurality of slats) 69, including slats 6 and 7.

In FIG. 5A, slats 6 and 7 are fixed at an acute angle 1 relative to the base 550. While the slats can form any suitable angle relative to a length of the base (or the plane of the array), angle 1 is approximately 67.5 degrees. As the range of the array tilt angle required to redirect incoming sunlight that ranges between 0° to 90° is approximately 45°, tilting this array at angles ranging between −22.5° and +22.5° should meet this requirement. This embodiment has the advantage of less required vertical travel, and this could be beneficial for minimizing the height of a weatherproof enclosure.

The base 550 is positioned below the horizontal, and at an angle 2 relative to the horizontal. This configuration allows redirector 500 to redirect light rays received from a high sun position (e.g., 3, 4 and 5) more efficiently than redirector 500 would be able to in the configuration shown in FIG. 5B. In FIG. 5B, slats 6 and 7 are still fixed at acute angle 1 relative to base 550. However, base 550 has been adjusted via adjustment mechanism 63 to be positioned above the horizontal, and at an angle 8 relative to the horizontal. This configuration allows redirector 500 to redirect light rays received from a lower sun position (e.g., 9 and 79) more efficiently than as shown in the configuration of FIG. 5A.

The inventive subject matter advantageously further includes redirection systems that include two or more redirectors that can redirect sunlight at different angles. Two or more mirror array assemblies can be employed in a redirection system, and an algorithm can be used to determine the mode which most efficiently deflects the sun to a desired direction. An especially contemplated algorithm selects an optimum operating mode, depending on an incoming sun angle. Contemplated modes can operate, for example, as follows: Mode 1: The first array deflects the sun into a desired output direction, and the second array is oriented for transparency to the light deflected from the first array (e.g., FIG. 6C). Mode 2: The first array is oriented for transparency to the sun, and the second array deflects the sun into a desired output direction (e.g., FIG. 6B). Mode 3: Both arrays move in tandem to deflect the sun into a desired output direction (e.g., FIG. 6A).

Additionally or alternatively, a sunlight redirector employing two or more mirror arrays can comprise a first array configured to intercept sunlight, and oriented for efficient interception of the sun. The first array can further be configured to deflect the sun into a new direction, onto the second array. This new direction can be selected, for example, for at least one of the following modes: Mode 1: Efficient redirection can be achieved by the first array, so the second array is moved to become transparent to the reflected light from the first array; or Mode 2: Light in this direction can be efficiently intercepted by the second array, and efficiently redirected into a selected direction for the output beam.

The combination of the two or more arrays has many degrees of orientation freedom, and in principle only two degrees of freedom are necessary to deflect a sunbeam to any angle. Therefore, these arrangements have the advantage that for any sun angle, there are a great many possible "orientation formulas" that can cause the necessary or desired deflection. Where an algorithm for selecting the most practical "orientation formula" is used, the algorithm can advantageously take into account both efficiency and ease of fabrication, for the sun angle in question. Within a given range of solar altitudes, contemplated algorithms can formulaically prescribe the orientation of one, two, three or even more arrays of a redirection system based on the sun's position or direction. Applying such algorithm(s) for selecting the most practical "orientation formula" can result in adjusting between different reflection modes, depending at least in part on solar altitude, and the desired redirected output angle.

Figure 6A:
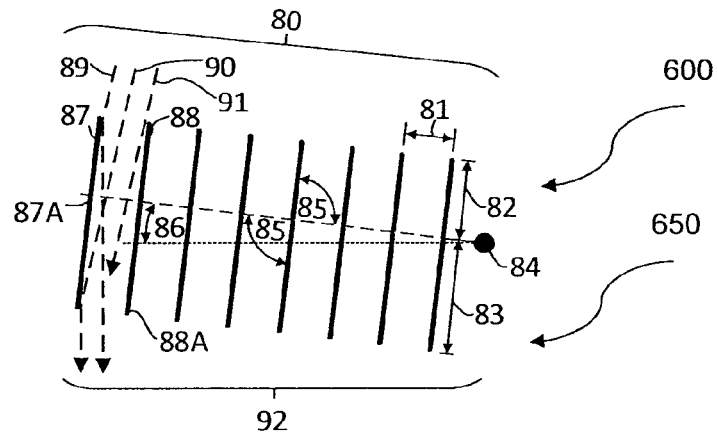
FIGS. 6A-6C illustrate an exemplary redirection system having multiple mirror array redirectors.
Figure 6B:
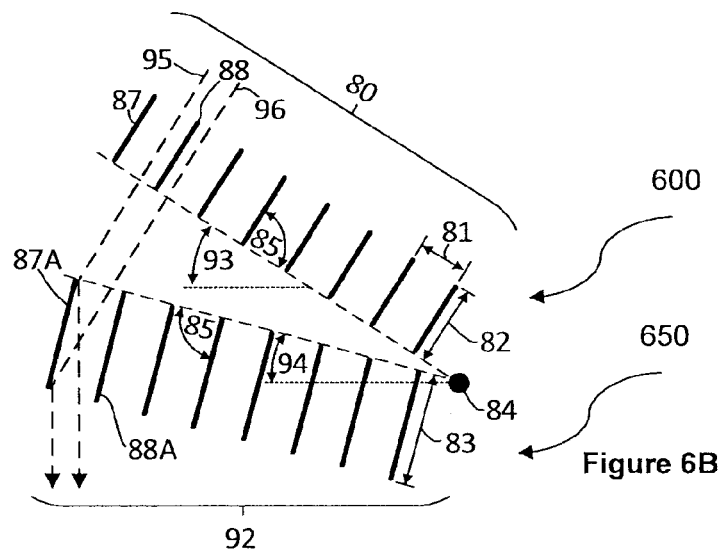
Figure 6C:
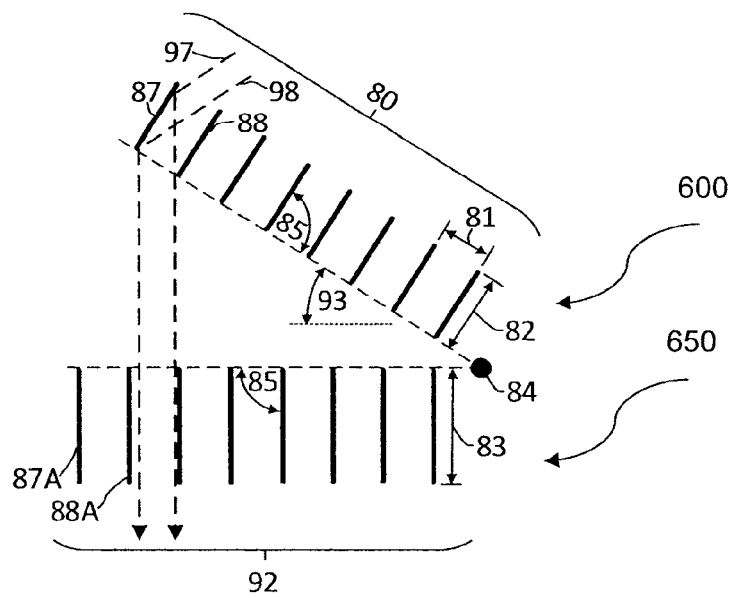

FIGS. 6A-6C show a redirection system that includes at least two redirectors, 600 and 650. Each of redirector 600 and 650 can be adjusted relative to one another (via adjustment mechanism 84), and adjusted independently as set forth above. Redirector 600 comprises a plurality of slats 80 including slat 87 and slat 88, some or all of which have a length 82. The slats are spaced apart by distance 81, and each of the slats is substantially orthogonal to a length of the base (shown as angle 85). The range of the array tilt angle required to redirect incoming sunlight that ranges between 0° and 90° is approximately 45°. Consequently, the first redirector 600 is preferably adjustable between 0° to 45° relative to the horizontal.

Redirector 650 comprises a plurality of slats 92 including slat 87A and slat 88A, some or all of which are longer than the slats of redirector 600 and have a length of 83. The slats are also spaced apart by distance 81, and each of the slats is substantially orthogonal to a length of the second redirector's base (shown as angle 85). As used herein, the term "substantially orthogonal" means forming an angle of between 75-105 degrees.

In the configuration shown in FIG. 6A, the bases of redirector 600 and redirector 650 juxtapose one another and are parallel or substantially parallel (i.e., forming an angle of less than 10 degrees when placed side by side). Here, both redirectors are positioned to achieve the optimal position for desired sunlight redirection that could also result in the lowest mirror spacing ratio. Each of the redirector bases are positioned above the horizontal at angle 86 such that light rays 89, 90 and 91 can be redirected by a combination of slats 87 and 87A to a desired location. Such a configuration may be suitable, for example, where sunlight is received from a relatively high sun position (relative to the embodiments shown in FIGS. 6B and 6C).

In the configuration shown in FIG. 6B, redirectors 600 and 650 have each been adjusted to accommodate a lowering in sun position throughout the day. Here, the bottom redirector can be positioned to achieve the optimal position for desired sunlight redirection and the top redirector can be positioned such that it provides minimal obstruction for the incident sunlight, while also providing a moderate spacing ratio.

As shown, the base of redirector 600 forms an angle 93 relative to the horizontal. The base of redirector 650 forms an angle 94 relative to the horizontal and is no longer parallel to the base of redirector 600. Such a configuration may be suitable, for example, where light rays are received from a mid-sun position (relative to the embodiments shown in FIGS. 6A and 6C). Here, light rays 95, 96 pass through the slats of redirector 650 and is redirected by slat 87A of redirector 650.

In the configuration shown in FIG. 6C, redirector 650 has been further adjusted to align with the horizontal via adjustment mechanism 84, while redirector 600 remains in the orientation shown in FIG. 6B. FIG. 6C shows the top redirector moving to achieve the optimal position for desired sunlight redirection and the bottom redirector is positioned such that it provides minimal obstruction for the sunlight that has been redirected by the top redirector. Such a configuration may be suitable where, for example, light rays 97 and 98 are received from a lower sun position. Here, light rays 97 and 98 are redirected by slat 87 of redirector 600, and pass through the slats of redirector 650 to the desired endpoint.

The spacing ratios can be chosen to optimize performance for a given location (e.g., to maximize peak output, annual output, or minimize annual or seasonal variation in output). The embodiment depicted in FIGS. 6A-6C enables output beam azimuth steering with 2 axis control which may have advantages in terms of reduced cost and complexity. This embodiment has limited ability to redirect the sunlight for sun positions that are directly overhead but, if desired, this limitation can be overcome by using one of the multi-redirector systems.

Figure 7A:
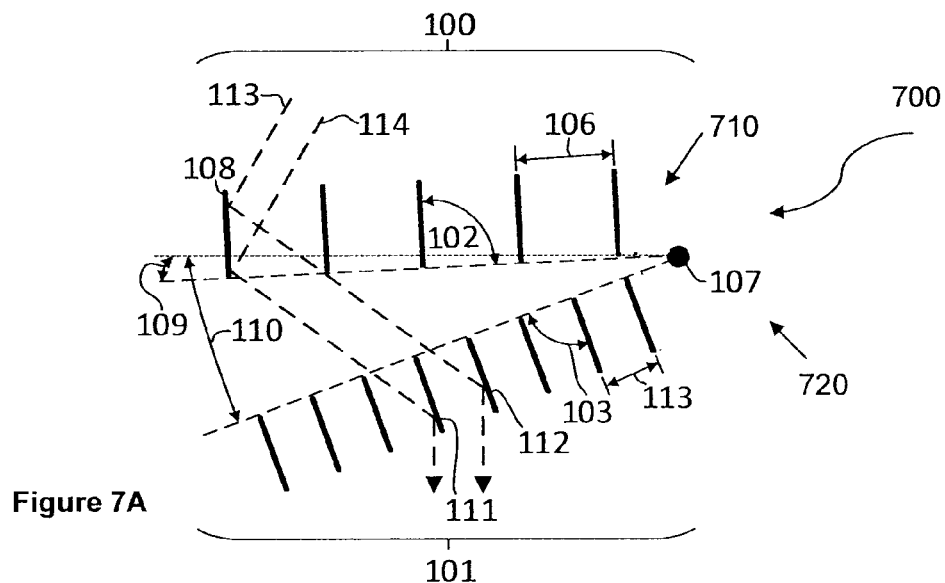
FIGS. 7A-7B illustrate another redirection system having multiple mirror array redirectors.
Figure 7B:
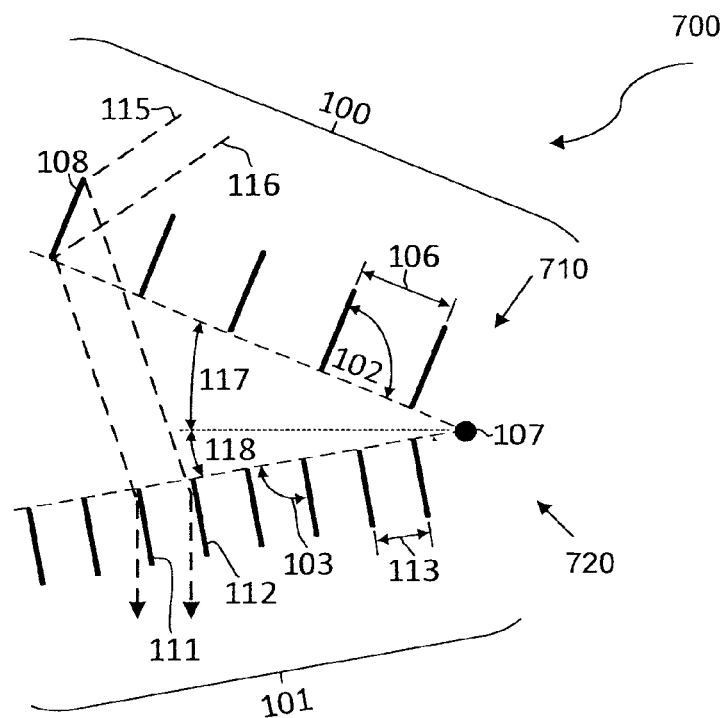

FIGS. 7A-7B illustrate another exemplary multi-redirector system 700 working in a single mode, where the two arrays (of redirectors 710 and 720, respectively) have different spacing ratios. The first array redirects rays towards the second array at an efficient angle for it to redirect it to a final output direction. The longitudinal slats are oriented at an angle of approximately 90° relative to the plane of the arrays, and the required angular range for the tilt angle may be between −20° and +25°.

First redirector 710 comprises slats that are further spaced apart than slats of second redirector 720. Redirector 710 comprises a plurality of slats 100 including slat 108, which are spaced apart by distance 106, and substantially orthogonal to a base at angle 102. Redirector 720 includes a plurality of slats 101 including slats 111 and 112, which are spaced apart by a shorter distance 113 than distance 106, and which are also substantially orthogonal to a base at angle 103. Each of the redirectors 710 and 720 are coupled to an adjustment mechanism 107, which can adjust a position of each of the redirectors' bases sequentially or simultaneously.

In the configuration shown in FIG. 7A, the base of redirector 710 is positioned below the horizontal at angle 109. The base of redirector 720 is positioned further below the horizontal at angle 110. The positioning of redirectors 710 and 720 allow light rays 113 and 114 to bounce off of slat 108 at a first angle, and then bounce of slats 111 and 112 at a second angle to a desired endpoint.

In the configuration shown in FIG. 7B, the base of redirector 710 is adjusted above the horizontal at angle 117, and the base of redirector 720 is adjusted to just below the horizontal at angle 118. The positioning of redirectors 710 and 720 allow light rays 115 and 116 received from a lower sun position relative to the light rays 113 and 114 of FIG. 7A to bounce off of slat 108 at a first angle, and then bounce off slats 111 and 112 at a different angle to a desired endpoint.

It should be appreciated that a slat included in systems of the inventive subject matter could be configured to receive and redirect light sequentially at different angles based at least in part on the positioning of a base relative to the horizontal, the angle between the base and the slat, and the direction of incoming light rays.

Figure 8A:
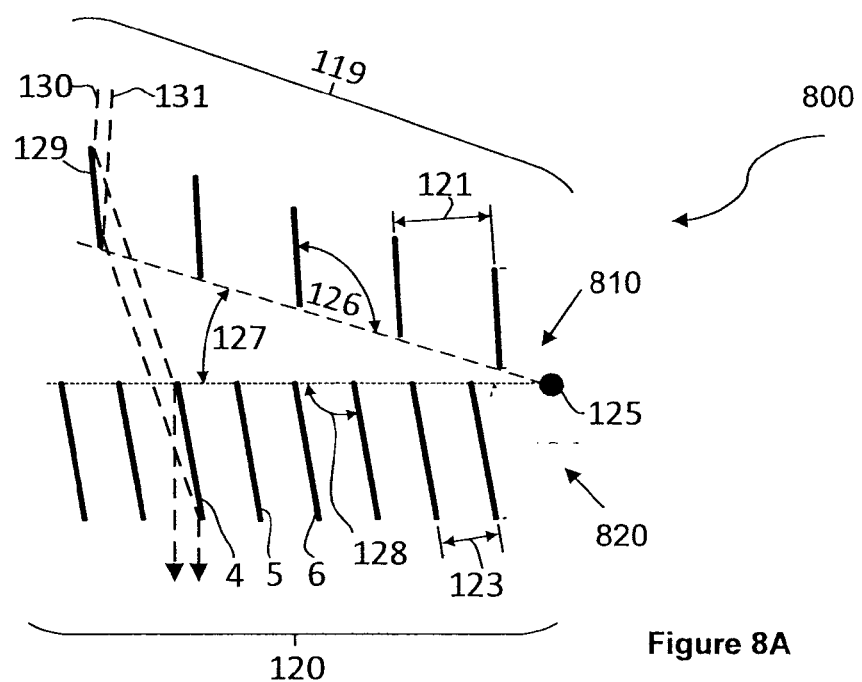
FIGS. 8A-8B illustrate yet another redirection system having multiple mirror array redirectors.
Figure 8B:
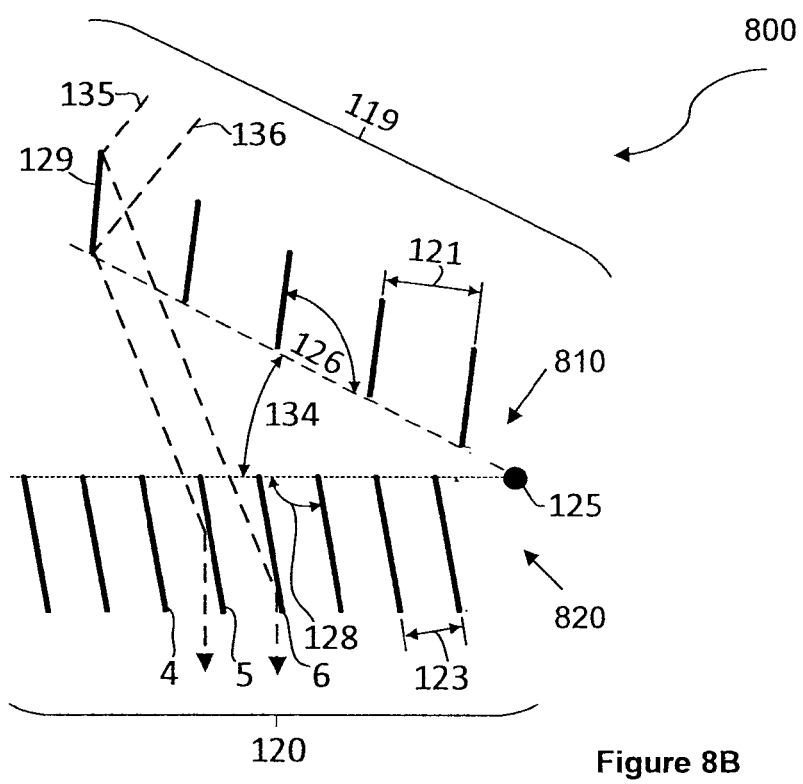

FIGS. 8A-8B illustrate another exemplary multi-redirector system 800 working in a single mode similar to the embodiment shown in FIGS. 7A-7B, but wherein at least some of the slats of at least one redirector are not orthogonal to a length of the base. Redirector 810 includes a plurality of slats 119 including slat 129, some of which are spaced apart by distance 121. Slat 129 forms an angle 126 relative to the base of redirector 810, and the length of the base of redirector 810 forms an angle 127 relative to the horizontal. As shown, the longitudinal slats oriented at an angle of approximately 67.5° degrees (e.g., between 45 and 85 degrees, more typically between 55 and 80 degrees, and even more typically between 60 and 75 degrees) for the top array and approximately 110° degrees (e.g., between 95 and 125 degrees, more typically between 100 and 120 degrees, and even more typically between 105 and 115 degrees) for the bottom array. The required angular range for the tilt angle for this embodiment is typically between 0° and 45°.

Redirector 820 comprises a plurality of slats 120 including slats 4, 5 and 6, each of which form an angle 128 with the base of redirector 820. The slats of redirector 820 are spaced apart by distance 123, which is smaller than the distance between at least some of the slats of redirector 810.

In the configuration shown in FIG. 8A, redirector 820 is positioned such that its base is substantially aligned with the horizontal. The base of redirector 810 has been adjusted via adjustment mechanism 125, and forms an angle 127 with respect to the horizontal and the base of the second redirector 820 (when horizontal). Such a configuration may be suitable, for example, where sunlight is received from a relatively high sun position (relative to the embodiment shown in FIG. 8B). Here, rays 130 and 131 are redirected from slat 129 to slat 4, and further redirected from slat 4 to a desired location.

In the configuration shown in FIG. 8B, redirector 820 is still positioned such that its base is substantially horizontal. The base of redirector 810, however, has been further adjusted and forms a greater angle 134 with respect to the horizontal. Such a configuration may be suitable, for example, where sunlight is received from a relatively low sun position (relative to the embodiment shown in FIG. 8A). Here, rays 135 and 136 are redirected from slat 129 to slats 5 and 6, respectively, and further redirected from slats 5 or 6 to a desired location.

In an alternative double redirector system, the longitudinal slats could be oriented at an angle of approximately 90° (e.g., between 80 and 100°) relative to the plane of the array or length of the base for both redirectors, and the required angular range for the tilt angle could be between −20° and +45°. When the sun position is high, a double bounce mode can be used wherein light is redirected from slats of both redirectors to increase the angle change and improve performance. When sun position is low, the single bounce mode wherein some or all of the light passes between slats of one redirector and is redirected only by slats of another redirector can be used to maximize performance. For example, the top array could redirect the sun and the bottom array could be moved to provide the minimum obstruction for the redirected beam. The spacing ratios can be chosen to optimize performance for a given location (e.g., to maximize peak output, annual output, or minimize annual or seasonal variation in output). When using double bounce mode, azimuth steering of the output beam is generally not achieved without a third control axis, except for example, in the special case of steering the beam directly normal to the redirector panel, where output beam altitude=−90°, and output beam azimuth doesn't matter.

In some aspects of the inventive subject matter, a separate optical element could be provided to further redirect or steer beams, for example, in the event that the upstream redirectors only outputs light at a fixed angle. In some embodiments, a sunlight redirector can include a third mirror array configured to re-direct a stationary solar beam into a desired direction or a desired range of directions. The aim of this third mirror array is to produce that maximum useful value to people of the light being delivered. This can involve providing distributions that are pleasant, which often is best achieve by producing a "natural" viewing environment. For example, the third mirror array could deliver into a space a large number of small patches of high illuminance, akin to the patterns found on a forest floor on a sunny day. Additionally or alternatively, if desired, the mirrors in this third array could be programmed to move in order to serve various purposes at various times. Additionally or alternatively, through gentle random undulation of any of the mirror arrays, it may be possible to emulate the appearance of a gentle breeze moving branches in an overhead canopy, again helping to connote a sense of peaceful, beautiful lighting.

Figure 9:
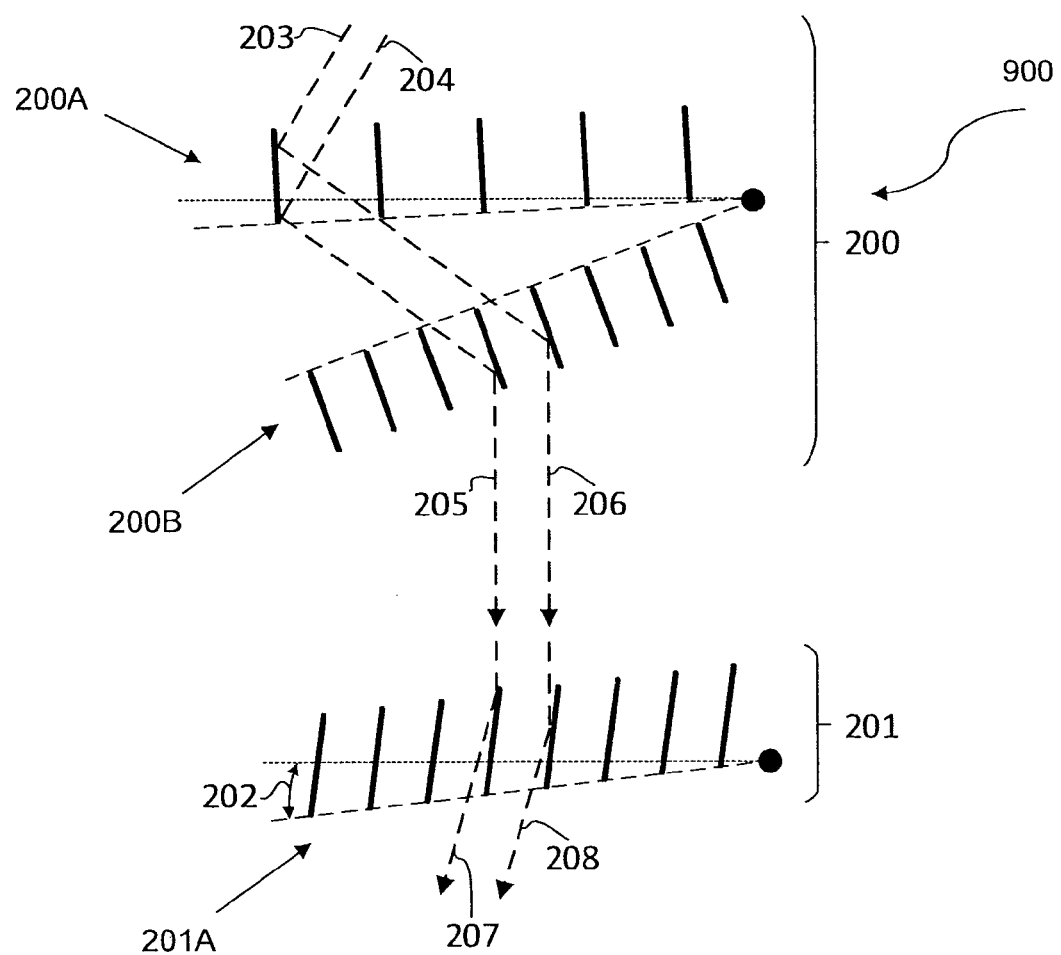
FIG. 9 illustrates a redirection system having a downstream beam steering element.

For example, FIG. 9 illustrates a redirection system 900 that includes a first set of redirectors 200 (similar to the two redirector systems described above) that direct a light vertically, and a downstream redirector 201 (positioned below the upstream redirectors of the first set of redirectors 200) that steers the light away from the vertical. This beam steering could be achieved using a single mirror, array of mirrors, or lens. FIG. 9 shows the beam steering element as an array of mirrors, as a non-limiting example.

The first set of redirectors 200 includes redirector 200A and redirector 200B. Redirector 200A includes a plurality of slats and is configured to redirect beams 203 and 204 to slats of redirector 200B. Redirector 200B further redirects beams 203 and 204 such that beams 205 and 206 exiting the first set of redirectors 200 are directed vertically to redirection subsystem 201. Redirection subsystem 201 includes a third redirector 201A and is positioned such that beams 205 and 206 can be redirected further in a non-vertical direction as beams 207 and 208.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided herein is prior art or relevant to the presently claimed invention, or that any publication specifically or implicitly referenced is prior art.

Thus, specific systems and methods of light redirection have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A light redirection system, comprising:
   a first base;
   first and second substantially parallel slats coupled to the first base, each of the first and second slats including a reflective surface and configured to sequentially redirect light at different first and second angles based at least in part on an adjustment of an angle between a length of the first base and the horizontal; and
   a first adjustment mechanism coupled to the first base and configured to enable the adjustment of the angle between the length of the first base and the horizontal;
   wherein an angle of the first slat relative to the length of the first base is adjustable independently of the second slat.

2. The system of claim 1, wherein a distance between the first and second slats is adjustable.

3. The system of claim 1, wherein the first and second slats are coupled to the first base such that each of the first and second slats extend substantially orthogonally from the first base.

4. The system of claim 1, further comprising:
   a second base coupled to the first base; and
   third and fourth substantially parallel slats coupled to the second base, each of the third and fourth slats including a reflective surface and configured to sequentially redirect light at third and fourth different angles based at least in part on an adjustment of an angle between a length of the second base and the horizontal.

5. The system of claim 4, wherein the first adjustment mechanism is further coupled to the second base and configured to enable the adjustment of the angle between the length of the second base and the horizontal.

6. The system of claim 5, wherein the first adjustment mechanism is further configured to enable simultaneous adjustment of (a) the angle between the length of the first base and the horizontal and (b) the angle between the length of the second base and the horizontal.

7. The system of claim 5, wherein the first adjustment mechanism is configured to enable an adjustment of an angle between the length of the first base and the length of the second base.

8. The system of claim 5, wherein the first adjustment mechanism enables the adjustment of the angle between the length of the first base and the horizontal and the angle between the length of the second base and the horizontal based on an algorithm that selects an optimal orientation of the first and second bases based on an angle of incoming light.

9. The system of claim 4, further comprising a second adjustment mechanism coupled to the second base and configured to enable the adjustment of the angle between the length of the first second and the horizontal.

10. The system of claim 9, wherein the first adjustment mechanism enables the adjustment of the angle between the length of the first base and the horizontal based on an algorithm that selects an optimal orientation of the first and second slats based on an angle of incoming light and wherein the second adjustment mechanism enables the adjustment of the angle between the length of the second base and the horizontal based on a second algorithm that selects an optimal orientation of the third and fourth slats based on an angle of redirected light.

11. The system of claim 4, wherein the first and third slats are positioned on the first and second bases, respectively, to enable an alignment of the first and third slats when the first and second bases are juxtaposed.

12. The system of claim 4, wherein a distance between the first and second slats is substantially the same as a distance between the third and fourth slats.

13. The system of claim 4, further comprising a third base coupled to fifth and sixth substantially parallel slats, wherein each of the fifth and sixth slats are configured to redirect light received from at least one of the third and fourth slats.

14. The system of claim 1, wherein the first and second slats are connected to one another such that an adjustment of an angle of the first slat relative to the first base simultaneously adjusts an angle of the second slat relative to the first base.

15. The system of claim 1, wherein the first adjustment mechanism enables the adjustment of the angle between the length of the first base and the horizontal based on an algorithm that selects an optimal orientation of the first and second slats based on an angle of incoming light.

16. A light redirection system, comprising:
   a first base;
   first and second slats coupled to the first base, wherein the first slat includes a reflective surface and is configured to sequentially redirect light at different first and second angles based at least in part on an adjustment of an angle between a length of the first base and the horizontal;
   a first adjustment mechanism coupled to the first base and configured to enable the adjustment of the angle between the length of the first base and the horizontal;
   a second base coupled to the first base; and
   third and fourth slats coupled to the second base, wherein the third slat includes a reflective surface and is configured to redirect light received from at least one of the first and second slats at a third angle different from the first and second angles.

17. A light redirection system, comprising:
   a first base;
   first and second slats coupled to the first base, wherein the first slat includes a reflective surface and is configured to sequentially redirect light at different first and second angles based at least in part on an adjustment of an angle between a length of the first base and the horizontal;
   a first adjustment mechanism coupled to the first base and configured to enable the adjustment of the angle between the length of the first base and the horizontal;
   a second base coupled to the first base;

third and fourth slats coupled to the second base, wherein the third slat includes a reflective surface and is configured to redirect light received from at least one of the first and second slats at a third angle different from the first and second angles;
a third base downstream from the first and second bases; and
fifth and sixth slats coupled to the third base, wherein the fifth slat is configured to redirect light received from at least one of the third and fourth slats.

\* \* \* \* \*